United States Patent
Kock et al.

(10) Patent No.: US 9,416,262 B2
(45) Date of Patent: *Aug. 16, 2016

(54) HETEROPHASIC PROPYLENE COPOLYMER WITH EXCELLENT IMPACT/STIFFNESS BALANCE

(75) Inventors: Cornelia Kock, Pucking (AT); Petar Doshev, Linz (AT); Elisabeth Potter, Linz (AT); Guenter Gsellmann, Linz (AT); Pauli Leskinen, Helsinki (FI)

(73) Assignee: BOREALIS AG (AT)

( * ) Notice: Subject to any disclaimer, the term of this patent is extended or adjusted under 35 U.S.C. 154(b) by 309 days.

This patent is subject to a terminal disclaimer.

(21) Appl. No.: 13/813,796

(22) PCT Filed: Aug. 1, 2011

(86) PCT No.: PCT/EP2011/063250
§ 371 (c)(1),
(2), (4) Date: Mar. 22, 2013

(87) PCT Pub. No.: WO2012/016965
PCT Pub. Date: Feb. 9, 2012

(65) Prior Publication Data
US 2013/0178586 A1    Jul. 11, 2013

(30) Foreign Application Priority Data
Aug. 6, 2010   (EP) .................................. 10172178

(51) Int. Cl.
 C08L 23/12   (2006.01)
 C08L 23/14   (2006.01)
 C08F 297/08  (2006.01)
 C08L 23/16   (2006.01)

(52) U.S. Cl.
 CPC ............. *C08L 23/14* (2013.01); *C08F 297/086* (2013.01); *C08L 23/12* (2013.01); *C08L 23/16* (2013.01); *C08L 2205/03* (2013.01); *C08L 2205/035* (2013.01); *C08L 2308/00* (2013.01); *C08L 2314/02* (2013.01)

(58) Field of Classification Search
 CPC .. C08F 297/083; C08F 297/086; C08L 23/10; C08L 23/12; C08L 23/14; C08L 23/16; C08L 2205/03; C08L 2205/035; C08L 2205/025; C08L 2308/00
 USPC ............................ 525/53, 240, 242, 245, 247
 See application file for complete search history.

(56) References Cited

U.S. PATENT DOCUMENTS

| 8,822,602 B2 * | 9/2014 | Leskinen et al. ............. 525/199 |
| 2004/0013870 A1 | 1/2004 | Sheldon et al. |

FOREIGN PATENT DOCUMENTS

| EP | 1801156 A1 | 6/2007 |
| EP | 1892264 A1 | 2/2008 |
| EP | 2036947 A1 | 3/2009 |
| EP | 2182030 A1 * | 5/2010 |
| WO | 0068315 A1 | 11/2000 |

* cited by examiner

*Primary Examiner* — Roberto Rabago
(74) *Attorney, Agent, or Firm* — Tarolli, Sundheim, Covell & Tummino LLP (57) ABSTRACT

Heterophasic propylene copolymer comprising —a matrix (M) being a polypropylene, said polypropylene comprises at least three polypropylene fractions, the three polypropylene fractions differ from each other by the melt flow rate $MFR_2$ (230° C.) and at least one of the three polypropylene fractions has a melt flow rate $MFR_2$ (230° C.) in the range of 1.0 to 15.0 g/10 min, and —an elastomeric propylene copolymer dispersed in said matrix, wherein —the heterophasic propylene copolymer has a melt flow rate $MFR_2$ (230° C.) of equal or more than 20.0 g/10 min, and —the amorphous phase of the xylene cold soluble fraction of the heterophasic propylene copolymer has an intrinsic viscosity of equal or higher than 2.0 dl/g.

16 Claims, 2 Drawing Sheets

Figure 1    Impact stiffness balance at 23 °C

Figure 2    Impact stiffness balance at -20 °C

HETEROPHASIC PROPYLENE COPOLYMER WITH EXCELLENT IMPACT/STIFFNESS BALANCE

RELATED APPLICATION

This application is a National Phase filing of PCT/EP2011/063250, filed Aug. 1, 2011, which claims priority from European Application No. 10172178.5, filed Aug. 6, 2010, the subject matter of which are incorporated herein by reference in their entirety.

The present invention is directed to a new heterophasic propylene copolymer (HECO), its manufacture and use.

Heterophasic propylene copolymers are well known in the art. Such heterophasic propylene copolymers comprise a matrix being either a propylene homopolymer or a random propylene copolymer in which an elastomeric copolymer is dispersed. Thus the polypropylene matrix contains (finely) dispersed inclusions being not part of the matrix and said inclusions contain the elastomeric copolymer. The term inclusion indicates that the matrix and the inclusion form different phases within the heterophasic propylene copolymer, said inclusions are for instance visible by high resolution microscopy, like electron microscopy or scanning force microscopy.

One application of the heterophasic propylene copolymers is its use as packaging material. In this market segment downgauging and light-weighing is a recurring market need, since it allows for energy and material savings. In order to provide a material equipped with these features, a high stiff material with good impact properties needs to be developed. The high stiffness enables lower wall thicknesses. Furthermore, a cycle time reduction is possible since a certain stiffness needed for demoulding of the specimen is reached at shorter cooling times. However, the impact performance which determines application performance, like drop height, needs to stay on a high level. Additionally, the materials should show high flowability otherwise injection moulding of specimen with thin wall thickness is not possible. High flow materials, generally show high stiffness due to shorter polymer chains which have less stereo-defects. However, the impact performance becomes reduced due to shorter polymer chains which form less entanglements.

Thus, the object of the present invention is to obtain a material of high flowability and stiffness and good impact performance.

The finding of the present invention is that the material must be a heterophasic propylene copolymer comprising a polypropylene matrix comprising three polypropylene fractions, wherein said three polypropylene fractions differ in the melt flow rate $MFR_2$ (230° C.) and one of said polypropylene fractions has a melt flow rate $MFR_2$ (230° C.) measured according to ISO 1133 of below 15 g/10 min, wherein further the elastomeric propylene copolymer has a rather high intrinsic viscosity, i.e. the amorphous phase (AM) of the xylene cold soluble fraction (XCS) of the heterophasic propylene copolymer has an intrinsic viscosity (IV) measured according to ISO 1628-1 (at 135° C. in decaline) of at least 2.0 dl/g.

Therefore the present invention is directed to a heterophasic propylene copolymer (HECO) comprising (a) a matrix (M) being a polypropylene (PP), said polypropylene (PP) comprises at least three polypropylene fractions (PP1), (PP2) and (PP3), the three polypropylene fractions (PP1), (PP2) and (PP3) differ from each other by the melt flow rate $MFR_2$ (230° C.) measured according to ISO 1133 and at least one of the three polypropylene fractions (PP1), (PP2) and (PP3) has a melt flow rate $MFR_2$ (230° C.) measured according to ISO 1133 in the range of 1.0 to 15.0 g/10 min, and (b) an elastomeric propylene copolymer (EC) dispersed in said matrix (M), wherein (i) said heterophasic propylene copolymer (HECO) has a melt flow rate $MFR_2$ (230° C.) measured according to ISO 1133 of equal or more than 20.0 g/10 min, and (ii) the amorphous phase (AM) of the xylene cold soluble fraction (XCS) of the heterophasic propylene copolymer (HECO) has an intrinsic viscosity (IV) measured according to ISO 1628-1 (at 135° C. in decaline) of equal or higher than 2.0 dl/g.

Figure 1:
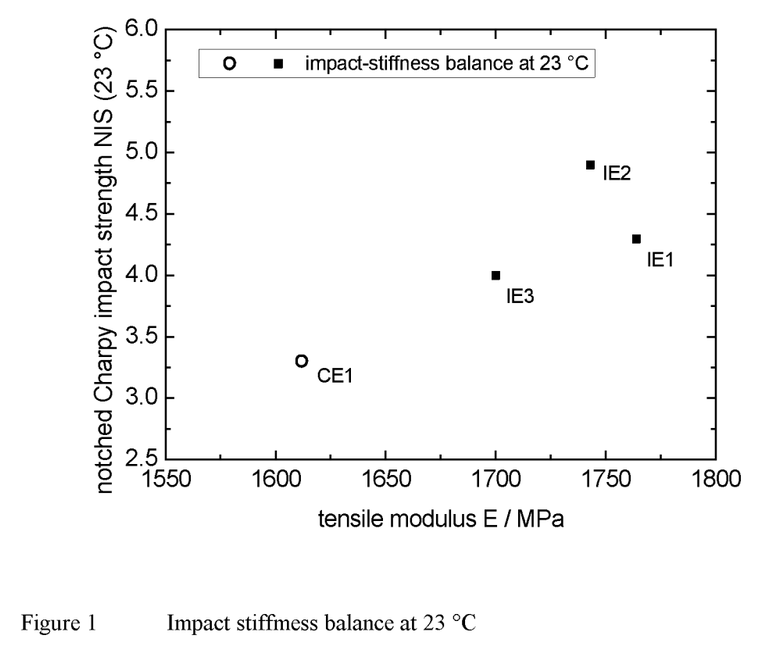
FIG. 1 illustrates a graph showing impact stiffness balance at 23° C.
Figure 2:
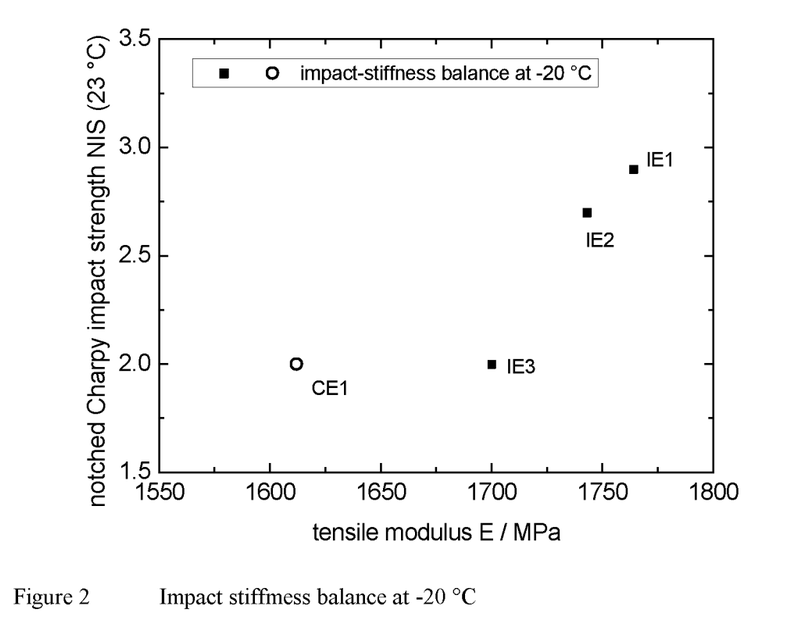
FIG. 2 illustrates a graph showing impact stiffness balance at −20° C.

Preferably the polypropylene (PP) is a random propylene copolymer (R-PP) or a propylene homopolymer (H-PP), the latter being preferred. Even more preferred the polypropylene (PP) comprises as polymer components the three polypropylene fractions (PP1), (PP2) and (PP3) only.

It has surprisingly found that the heterophasic propylene copolymer (HECO) is featured by very good stiffness/impact balance (see examples).

In the following the invention is described in more detail.

A heterophasic propylene copolymer (HECO) according to this invention comprises a polypropylene (PP) as a matrix (M) and dispersed therein an elastomeric propylene copolymer (EC). Thus the polypropylene (PP) matrix contains (finely) dispersed inclusions being not part of the matrix (M) and said inclusions contain the elastomeric propylene copolymer (EC). The term inclusion indicates that the matrix (M) and the inclusion form different phases within the heterophasic propylene copolymer (HECO), said inclusions are for instance visible by high resolution microscopy, like electron microscopy or scanning force microscopy.

Preferably the heterophasic propylene copolymer (HECO) according to this invention comprises as polymer components only the polypropylene (PP) and the elastomeric propylene copolymer (EC). In other words the heterophasic propylene copolymer (HECO) may contain further additives but no other polymer in an amount exceeding 2.0 wt-%, more preferably exceeding 1.0 wt.-%, like exceeding 0.5 wt.-%, based on the total heterophasic propylene copolymer (HECO). One additional polymer which may be present in such low amounts is a polyethylene which is a by-reaction product obtained by the preparation of heterophasic propylene copolymer (HECO) (see in detail below). Accordingly it is in particular appreciated that the instant heterophasic propylene copolymer (HECO) contains only the polypropylene (PP) matrix, the elastomeric propylene copolymer (EC) and optionally polyethylene in amounts as mentioned in this paragraph.

One aspect of the present invention is that the heterophasic propylene copolymer (HECO) is featured by a rather high melt flow rate. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.). Accordingly, it is preferred that in the present invention the heterophasic propylene copolymer (HECO) has an $MFR_2$ (230° C.) of equal or more than 20 g/10 min, more preferably of equal or more than 25.0 g/10 min, still more preferably in the range of 25.0 to 200.0 g/10 min, yet more preferably in the range of 25.0 to 180 g/10 min, like in the range of 30.0 to 150 g/10 min.

Preferably it is desired that the heterophasic propylene copolymer (HECO) is thermomechanically stable. Accordingly it is appreciated that the heterophasic propylene copolymer (HECO) has a melting temperature of at least 160° C., more preferably of at least 162° C., still more preferably in the range of 163 to 170° C.

Additionally it is preferred that the crystallization temperature of the heterophasic propylene copolymer (HECO) is at least 120° C., more preferably at least 122° C., still more preferably in the range of 120 to 135° C.

The heterophasic propylene copolymer (HECO) comprises apart from propylene also comonomers. Preferably the heterophasic propylene copolymer (HECO) comprises apart from propylene ethylene and/or $C_4$ to $C_{12}$ α-olefins. Accordingly the term "propylene copolymer" according to this invention is understood as a polypropylene comprising, preferably consisting of, units derivable from
(a) propylene
and
(b) ethylene and/or $C_4$ to $C_{12}$ α-olefins.

Thus the propylene copolymers according to this invention, i.e. the heterophasic propylene copolymer (HECO), the random propylene copolymer fractions of the matrix, and the elastomeric propylene copolymer (EC), comprise monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the propylene copolymers according to this invention comprise, especially consist of, monomers copolymerizable with propylene from the group consisting of ethylene, 1-butene and 1-hexene. More specifically the propylene copolymers of this invention comprise—apart from propylene—units derivable from ethylene and/or 1-butene. In a preferred embodiment the propylene copolymers according to this invention comprise units derivable from ethylene and propylene only. Still more preferably the random propylene copolymer fractions of the matrix—if present—as well as the elastomeric propylene copolymer (EC) contain the same comonomers, like ethylene.

Accordingly, the elastomeric propylene copolymer (EC) is preferably an ethylene propylene rubber (EPR), whereas the polypropylene (PP) is either a random propylene copolymer (R-PP) or a propylene homopolymer (H-PP), the latter being preferred.

Additionally it is appreciated that the heterophasic propylene copolymer (HECO) preferably has a comonomer content equal or below 10 wt.-%, more preferably in the range of 2.0 to 10.0 wt.-%, more preferably in the range of 3.0 to 9.0 wt.-%, yet more preferably in the range of 3.5 to 7.0 wt.-%.

The xylene cold soluble (XCS) fraction measured according to ISO6427 (23° C.) of the heterophasic propylene copolymer (HECO) is preferably below 20.0 wt.-%, more preferably in the range of 5.0 to 20.0 wt.-%, like in the range of 9.0 to 18.0 wt.-%.

The heterophasic propylene copolymer (HECO) is in particular defined by the matrix (M) and the elastomeric propylene copolymer (EC) dispersed therein. Accordingly both components are now defined in more detail.

The matrix (M) is a polypropylene (PP), more preferably a random propylene copolymer (R-PP) or a propylene homopolymer (H-PP), the latter especially preferred.

Accordingly the comonomer content of the polypropylene (PP) is equal or below 1.0 wt.-%, yet more preferably not more than 0.8 wt.-%, still more preferably not more than 0.5 wt.-%, like not more than 0.1 wt.-%.

As mentioned above the polypropylene (PP) is preferably a propylene homopolymer (H-PP).

The expression propylene homopolymer as used throughout the instant invention relates to a polypropylene that consists substantially, i.e. of equal or below than 99.9 wt.-%, of propylene units. In a preferred embodiment only propylene units in the propylene homopolymer are detectable. The comonomer content can be determined by FT infrared spectroscopy, as described below in the example section.

In case the polypropylene (PP) is a random propylene copolymer (R-PP) it is appreciated that the random propylene copolymer (R-PP) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the random propylene copolymer (R-PP) according to this invention comprises, especially consists of, monomers copolymerizable with propylene from the group consisting of ethylene, 1-butene and 1-hexene. More specifically the random propylene copolymer (R-PP) of this invention comprises—apart from propylene—units derivable from ethylene and/or 1-butene. In a preferred embodiment the random propylene copolymer (R-PP) comprises units derivable from ethylene and propylene only.

Additionally it is appreciated that the random propylene copolymer (R-PP) has preferably a comonomer content in the range of more than 0.1 to 2.0 wt.-%, more preferably in the range of more than 0.1 to 1.6 wt.-%, yet more preferably in the range of 0.1 to 1.0 wt.-%.

The term "random" indicates that the comonomers of the propylene copolymer (R-PP), as well as of the first random propylene copolymer (R-PP1), the second random propylene copolymer (R-PP2), and third random propylene copolymer (R-PP3), are randomly distributed within the propylene copolymers. The term random is understood according to IUPAC (Glossary of basic terms in polymer science; IUPAC recommendations 1996).

As stated above the heterophasic propylene copolymer (HECO) has a rather high melt flow rate. Accordingly, the same holds true for its matrix (M), i.e. the polypropylene (PP). Thus it is preferred that polypropylene (PP) has a melt flow rate $MFR_2$ (230° C.) measured according to ISO 1133 in the range of 30.0 to 500.0 g/10 min, more preferably of 40.0 to 400.0 g/10 min, still more preferably in the range of 50.0 to 300.0 g/10 min.

Further is appreciated that the matrix (M) of the heterophasic propylene copolymer (HECO) is featured by a moderately broad molecular weight distribution. Accordingly it is appreciated that the matrix of the heterophasic propylene copolymer (HECO), i.e. the polypropylene (PP), has a molecular weight distribution (MWD) of equal or less than 8.0, preferably of equal or less than 7.0, more preferably in the range of 3.0 to 7.0, still more preferably in the range of 3.5 to 6.5.

Additionally the polypropylene (PP) can be defined by its molecular weight. Thus it appreciated that the polypropylene (PP) has a weight average molecular weight (Mw) measured by gel permeation chromatography (GPC; ISO 16014-4: 2003) of equal or less than 175 kg/mol, more preferably of equal or less than 165 kg/mol, yet more preferably in the range of 75 to 160 kg/mol, still more preferably in the range of 80 to 150 kg/mol.

The xylene cold soluble (XCS) content of the polypropylene (PP) is rather moderate. Accordingly xylene cold soluble (XCS) content measured according to ISO 6427 (23° C.) is preferably equal or below 3.5 wt.-%, more preferably equal or below 3.0 wt.-%, still more preferably in the range of 0.5 to 3.0 wt.-%, like in the range of 0.5 to 2.8 wt.-%.

As indicated above the polypropylene (PP) comprises at least three, more preferably comprises three, yet more preferably consists of three, polypropylene fractions (PP1), (PP2), and (PP3), the three polypropylene fractions (PP1), (PP2), and (PP3) differ from each other by the melt flow rate $MFR_2$ (230° C.) measured according to ISO 1133.

One of the three polypropylene fractions (PP1), (PP2), and (PP3), preferably the third polypropylene fraction (PP3), has a melt flow rate $MFR_2$ (230° C.) measured according to ISO 1133 in the range of 1.0 to 15.0 g/10 min, preferably in the range of 2.0 to 15.0 g/10 min, still more preferably in the range of 2.0 to 13.0 g/10 min. Still more preferably the polypropylene fraction with the melt flow rate $MFR_2$ (230° C.) measured according to ISO 1133 in the range of 1.0 to 15.0 g/10 min, i.e. in the range of 2.0 to 15.0 g/10 min, like in the range of 2.0 to 13.0 g/10 min, is the polypropylene fraction with the lowest melt flow rate $MFR_2$ (230° C.) of the three polypropylene fractions (PP1), (PP2) and (PP3), preferably of all polypropylene fractions present, of the polypropylene (PP). Accordingly in one preferred embodiment the third polypropylene fraction (PP3) has the lowest melt flow rate $MFR_2$ (230° C.) of the three polypropylene fractions (PP1), (PP2), and (PP3), wherein the melt flow rate $MFR_2$ (230° C.) measured according to ISO 1133 of the third polypropylene fraction (PP3) is in the range of 1.0 to 15.0 g/10 min, preferably in the range of 2.0 to 15.0 g/10 min, still more preferably in the range of 2.0 to 13.0 g/10 min.

In addition to the requirement that one of the three polypropylene fractions (PP1), (PP2) and (PP3) must have a melt flow rate $MFR_2$ (230° C.) measured according to ISO 1133 in the range of 1.0 to 15.0 g/10 min it is preferred that another fraction of the three polypropylene fractions (PP1), (PP2) and (PP3) has a melt flow rate $MFR_2$ (230° C.) measured according to ISO 1133 in the range of 80.0 to 500.0 g/10 min, preferably in the range of 150.0 to 450.0 g/10 min, more preferably in the range of 200.0 to 450.0 g/10 min. Particularly the first polypropylene fraction (PP1) has a melt flow rate $MFR_2$ (230° C.) measured according to ISO 1133 in the range of 80.0 to 500.0 g/10 min, preferably in the range of 150.0 to 450.0 g/10 min, more preferably in the range of 200.0 to 450.0 g/10 min.

In one preferred embodiment the remaining polypropylene fraction of the three polypropylene fractions (PP1), (PP2) and (PP3), preferably the second polypropylene fraction (PP2), has a melt flow rate $MFR_2$ (230° C.) measured according to ISO 1133 in the range of 20.0 to 300.0 g/10 min, preferably in the range of 30.0 to 250.0 g/10 min, more preferably in the range of 40.0 to 200.0 g/10 min.

Preferably the melt flow rate $MFR_2$ (230° C.) decreases from the first polypropylene fraction (PP1) to the third polypropylene fraction (PP3). Accordingly the ratio between the melt flow rate $MFR_2$ (230° C.) of the first polypropylene fraction (PP1) and the third polypropylene fraction (PP3) [MFR(PP1)/MFR(PP3)] is preferably at least 5, more preferably at least 10, yet preferably at least 15 and/or the ratio between the melt flow rate $MFR_2$ (230° C.) of the second polypropylene fraction (PP2) and the third polypropylene fraction (PP3) [MFR (PP2)/MFR(PP3)] is preferably at least 1.3, more preferably at least 2.0, yet more preferably at least 3.0.

In another preferred embodiment the melt flow rate $MFR_2$ (230° C.) decreases from the first polypropylene fraction (PP1) to the second polypropylene fraction (PP2) and from the second polypropylene fraction (PP2) to the third polypropylene fraction (PP3). Accordingly the second polypropylene fraction (PP2) has a lower melt flow rate $MFR_2$ (230° C.) than the first polypropylene fraction (PP1) but a higher melt flow rate $MFR_2$ (230° C.) than the third polypropylene fraction (PP3).

Thus the third polypropylene fraction (PP3) has the lowest melt flow rate $MFR_2$ (230° C.) of the three polypropylenes fractions (PP1), (PP2), and (PP3), more preferably of all polymers present in the polypropylene (PP).

Preferably at least one of the polypropylene fractions (PP1), (PP2), and (PP3) is a propylene homopolymer, even more preferred all polypropylene fractions (PP1), (PP2), and (PP3) are propylene homopolymers.

Thus in a preferred embodiment the matrix (M), i.e. the polypropylene (PP), of the heterophasic propylene copolymer (HECO) comprises
(a) a first polypropylene fraction (PP1) being a first propylene homopolymer (H-PP1) or a first random propylene copolymer (R-PP1),
(b) a second polypropylene fraction (PP2) being a second propylene homopolymer (H-PP2) or a second random propylene copolymer (R-PP2),
(c) a third polypropylene fraction (PP3) being a third propylene homopolymer (H-PP3) or a third random propylene copolymer (R-PP3),
with the proviso that at least one of the three fractions PP1, PP2, and PP3 is a propylene homopolymer, preferably at least the first polypropylene fraction (PP1) is a propylene homopolymer, more preferably all three fractions (PP1), (PP2), and (PP3) are propylene homopolymers.

As mentioned above, it is in particular preferred that at least the first polypropylene fraction (PP1) is a propylene homopolymer, a so called first propylene homopolymer (H-PP1). Even more preferred this first polypropylene fraction (PP1) has the highest melt flow rate $MFR_2$ (230° C.) of the three polypropylenes (PP1), (PP2), and (PP3).

Still more preferred, in addition to the first polypropylene fraction (PP1) either the second polypropylene fraction (PP2) or the third polypropylene fraction (PP3) is a propylene homopolymer. In other words it is preferred that the polypropylene (PP) comprises, preferably consists of, only one polypropylene fraction being a random propylene copolymer. Accordingly either the second polypropylene fraction (PP2) is a propylene homopolymer, so called second propylene homopolymer (H-PP2), or the third polypropylene fraction (PP3) is a propylene homopolymer, so called third propylene homopolymer (H-PP3).

It is especially preferred that all three polypropylene fractions (PP1), (PP2), and (PP3) are propylene homopolymers.

In the following the three polypropylene fractions (PP1), (PP2), and (PP3) will be described in more detail.

As mentioned above the polypropylene fractions (PP1), (PP2), and (PP3) can be random propylene copolymers or propylene homopolymers. In any case the comonomer content shall be rather low for each of the polypropylene fractions (PP1), (PP2), and (PP3). Accordingly the comonomer content of each of the three polypropylene fractions (PP1), (PP2), and (PP3) is not more than 1.0 wt.-%, yet more preferably not more than 0.8 wt.-%, still more preferably not more than 0.5 wt.-%. In case of the random propylene copolymer fractions (R-PP1), (R-PP2), and (R-PP3) it is appreciated that the comonomer content for each of the random propylene copolymer fractions (R-PP1), (R-PP2), and (R-PP3) is in the range of more than 0.2 to 3.0 wt.-%, more preferably in the range of more than 0.2 to 2.5 wt.-%, yet more preferably in the range of 0.2 to 2.0 wt.-%.

Concerning the comonomers used in the first random propylene copolymer (R-PP1), the second random propylene copolymer (R-PP2), and the third random propylene copolymer (R-PP3) it is referred to the information provided for the heterophasic propylene copolymer (HECO). Accordingly the (R-PP1), (R-PP2), and (R-PP3) comprise independently from each other monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably (R-PP1), (R-PP2), and (R-PP3) comprise independently from each other, especially consists independently from each other of, monomers copolymerizable with propylene from the group consisting of ethylene, 1-butene and 1-hexene. More specifically the (R-PP1), (R-PP2), and (R-PP3) comprise independently from each other—apart from propylene—units derivable from ethylene and/or 1-butene. In a preferred embodiment the (R-PP1), (R-PP2), and (R-PP3) have apart from propylene the same comonomers. Thus in an especially preferred embodiment the (R-PP1), (R-PP2), and (R-PP3) comprise units derivable from ethylene and propylene only.

As stated above the first polypropylene fraction (PP1) is a random propylene copolymer fraction (R-PP1) or a propylene homopolymer fraction (H-PP1), the latter being preferred.

The xylene cold soluble (XCS) content measured according to ISO 6427 (23° C.) of the first polypropylene fraction (PP1) is preferably equal or below 4.0 wt.-%, more preferably equal or below 3.5 wt.-%, still more preferably in the range of 0.8 to 4.0 wt.-%, like in the range of 0.8 to 3.0 wt.-%.

As stated above the first polypropylene fraction (PP1) is featured by rather high melt flow rate $MFR_2$ (230° C.). Accordingly it is appreciated that the melt flow rate $MFR_2$ (230° C.) measured according to ISO 1133 is equal or more than 80.0 g/10 min, preferably of equal or more than 150.0 g/10 min more preferably in the range of 150.0 to 500.0 g/10 min, still more preferably in the range of 150.0 to 450.0 g/10 min, yet more preferably in the range of 200.0 to 450.0 g/10 min.

Alternatively or additionally the first polypropylene fraction (PP1) is defined by a low molecular weight. Thus it appreciated that the first polypropylene fraction (PP1) has a weight average molecular weight (Mw) measured by gel permeation chromatography (GPC; ISO 16014-4:2003) of equal or less than 130 kg/mol, more preferably of equal or less than 110 kg/mol, yet more preferably in the range of 72 to 110 kg/mol, still more preferably in the range of 75 to 100 kg/mol.

The second polypropylene fraction (PP2) can be either a random propylene copolymer fraction (second random propylene copolymer fraction (R-PP2)) or a propylene homopolymer fraction (a second propylene homopolymer fraction (H-PP2)), the latter being preferred.

The xylene cold soluble (XCS) content measured according to ISO 6427 (23° C.) of the second polypropylene fraction (PP2) is preferably equal or below 4.0 wt.-%, more preferably equal or below 3.5 wt.-%, still more preferably in the range of 0.8 to 4.0 wt.-%, like in the range of 0.8 to 3.0 wt.-%.

As stated above the second polypropylene fraction (PP2) has a melt flow rate $MFR_2$ (230° C.) being higher than the third polypropylene fraction (PP3). On the other hand the melt flow rate $MFR_2$ (230° C.) of the first polypropylene fraction (PP1) can be higher or equally the same, preferably higher, as the melt flow rate $MFR_2$ (230° C.) of the second polypropylene fraction (PP2). Accordingly it is appreciated that the second polypropylene fraction (PP2) has melt flow rate $MFR_2$ (230° C.) measured according to ISO 1133 in the range of 20.0 to 300.0 g/10 min, preferably in the range of 30.0 to 250.0 g/10 min, more preferably in the range of 40.0 to 200.0 g/10 min.

The third polypropylene fraction (PP3) can be either a random propylene copolymer fraction (third random propylene copolymer fraction (R-PP3)) or a propylene homopolymer fraction (a third propylene homopolymer fraction (H-PP3)), the latter being preferred.

The xylene cold soluble (XCS) content measured according to ISO 6427 (23° C.) of the third polypropylene fraction (PP3) is preferably equal or below 4.0 wt.-%, more preferably equal or below 3.5 wt.-%, still more preferably in the range of 0.8 to 4.0 wt.-%, like in the range of 0.8 to 3.0 wt.-%.

As stated above the third polypropylene (PP3) has preferably the lowest melt flow rate $MFR_2$ (230° C.) of the three polypropylene fractions (PP1), (PP2), and (PP3), more preferably the lowest melt flow rate $MFR_2$ (230° C.) of the polymer fractions present in the polypropylene (PP). Accordingly it is appreciated that the third polypropylene (PP3) has melt flow rate $MFR_2$ (230° C.) measured according to ISO 1133 in the range of 1.0 to 15.0 g/10 min, preferably in the range of 2.0 to 15.0 g/10 min, still more preferably in the range of 2.0 to 13.0 g/10 min.

Especially good results are obtainable in case the individual fractions are present in specific amounts. Accordingly it is preferred that the amount of the polypropylene fraction having a melt flow rate $MFR_2$ (230° C.) measured according to ISO 1133 in the range of 1.0 to 15.0 g/10 min (preferably in the range of 2.0 to 15.0 g/10 min, still more preferably in the range of 2.0 to 13.0 g/10 min), preferably the amount of the third polypropylene fraction (PP3), is in the range of 15.0 to 60.0 wt.-% based, more preferably in the range of 20.0 to 40.0 wt.-%, on the total amount of the polypropylene (PP), preferably based on the amount of the polypropylene fractions (PP1), (PP2), and (PP3) together.

Further it is appreciated that the amount of the polypropylene fraction having a melt flow rate $MFR_2$ (230° C.) measured according to ISO 1133 in the range of 150.0 to 500.0 g/10 min, preferably in the range of 150.0 to 450.0 g/10 min, more preferably in the range of 200.0 to 450.0 g/10 min, preferably of the first polypropylene fraction (PP1), is in the range of 20.0 to 65.0 wt.-%, preferably in the range of 35.0 to 55.0 wt.-%, based on the total amount of the polypropylene (PP), preferably based on the amount of the polypropylene fractions (PP1), (PP2), and (PP3) together.

Finally the remaining fraction of the three polypropylene fractions (PP1), (PP2), and (PP3), preferably the second polypropylene fraction (PP2) is present in the range of 20.0 to 50.0 wt.-%, preferably in the range of 25.0 to 45.0 wt.-%, based on the total amount of the polypropylene (PP), preferably based on the amount of the polypropylene fractions (PP1), (PP2), and (PP3) together.

Accordingly in a preferred embodiment is the weight ratio [PP3/PP1] of the polypropylene fraction having a melt flow rate $MFR_2$ (230° C.) measured according to ISO 1133 in the range of 1.0 to 15.0 g/10 min, preferably of the third polypropylene fraction (PP3), and the polypropylene fraction having a melt flow rate $MFR_2$ (230° C.) measured according to ISO 1133 in the range of 150.0 to 500.0 g/10 min, preferably of the first polypropylene fraction (PP1), is in the range of 15/85 to 75/25, more preferably in the range of 25/75 to 55/45.

Very good results are achievable in case the polypropylene (PP) comprises (a) 20.0 to 65.0 wt.-%, preferably 35.0 to 55.0 wt.-%, of the first polypropylene (PP1), (b) 20.0 to 50.0 wt.-%, preferably 25.0 to 45.0 wt.-%, of the second polypropylene (PP2), and (c) 15.0 to 60.0 wt.-%, preferably 20.0 to 40.0 wt.-%, of the third polypropylene (PP3), based on the total amount of the first polypropylene fraction (PP1), the second polypropylene fraction (PP2), and the third polypropylene fraction (PP3).

Preferably the polypropylene (PP) is produced in a sequential polymerization process, preferably as described in detail below. Accordingly the three polypropylene fractions (PP1), (PP2), and (PP3) are an intimate mixture, which is not obtainable by mechanical blending.

A further essential component of the heterophasic propylene copolymer (HECO) is the elastomeric propylene copolymer (EC) dispersed in the matrix, i.e. in the polypropylene (PP). Concerning the comonomers used in the elastomeric propylene copolymer (EC) it is referred to the information provided for the heterophasic propylene copolymer (HECO). Accordingly the elastomeric propylene copolymer (EC) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the elastomeric propylene copolymer (EC) comprises, especially consists of, monomers copolymerizable with propylene from the group consisting of ethylene, 1-butene and 1-hexene. More specifically the elastomeric propylene copolymer (EC) comprises—apart from propylene—units derivable from ethylene and/or 1-butene. Thus in an especially preferred embodiment the elastomeric propylene copolymer (EC) comprises units derivable from ethylene and propylene only.

The properties of the elastomeric propylene copolymer (EC) mainly influences the xylene cold soluble (XCS) content as well as the amorphous phase (AM) of the final heterophasic propylene copolymer (HECO). Thus according to the present invention the amorphous phase (AM) of the heterophasic propylene copolymer (HECO) is regarded as the elastomeric propylene copolymer (EC) of the heterophasic propylene copolymer (HECO).

Accordingly one important requirement of the present invention is that the elastomeric propylene copolymer (EC) has a rather high weight average molecular weight. High intrinsic viscosity (IV) values reflect a high weight average molecular weight. Thus it is appreciated that the amorphous phase (AM) of the xylene cold soluble fraction (XCS) of the heterophasic propylene copolymer (HECO) has an intrinsic viscosity (IV) measured according to ISO 1628-1 (at 135° C. in decalin) of equal or higher than 2.0 dl/g, more preferably of equal or higher than 2.4 dl/g, i.e. 2.5 dl/g, still more preferably in the range of 2.4 to 5.0 dl/g, i.e. 2.5 to 5.0 dl/g, like in the range of 2.4 to 4.0, i.e. 2.5 to 4.0 dl/g.

The comonomer content, preferably the ethylene content, within the elastomeric propylene copolymer (EC) is comparatively low. Accordingly in a preferred embodiment the comonomer content, more preferably ethylene content, of the amorphous phase (AM) of the xylene cold soluble fraction (XCS) of the heterophasic propylene copolymer (HECO) is below 45.0 wt.-%, more preferably below 42.0 wt.-%, yet more preferably in the range of 25.0 to 45.0 wt.-%, like 30.0 to 42.0 wt.-%.

The heterophasic propylene copolymer (HECO) according to this invention preferably comprises (a) 80.0 to 94.0 wt.-%, more preferably 83.0 to 94.0 wt.-%, of the polypropylene (PP), and (b) 6.0 to 20.0 wt.-%, more preferably 6.0 to 17.0 wt.-%, of the elastomeric copolymer (EC), based on the total amount of the polypropylene (PP) and the elastomeric copolymer (EC), wherein the amount of the elastomeric copolymer (EC) corresponds to the amount of the amorphous fraction (AM) of the xylene cold soluble (XCS) fraction.

Finally the heterophasic propylene copolymer (HECO) of the instant invention preferably is additionally featured by at least one of the following characteristics: heat resistance (Vicat B), hexane solubles, tensile modulus and impact strength. Accordingly the heterophasic propylene copolymer (HECO) according to the instant invention preferably has (i) a heat resistance measured according to Vicat B of more than 78° C., more preferably in the range of 79 to 90° C., still more preferably in the range of 80 to 88° C., and/or (ii) hexane solubles measured according to FDA of below 3.6 wt.-%, more preferably of 1.5 to below 3.6 wt.-%, still more preferably in the range of 2.0 to 3.3 wt.-%, and/or (iii) a tensile modulus measured according to ISO 527-2 of at least 1600 MPa, more preferably of at least 1700 MPa, most preferably in the range from 1700 to 3000 MPa, and/or (iv) a Charpy notched impact strength measured according to ISO 179 (1 eA; 23° C.) of at least 3 kJ/m$^2$, preferably of at least 4 kJ/m$^2$, most preferably in the range from 4 to 50 kJ/m$^2$.

The heterophasic propylene copolymer (HECO) as defined in the instant invention may contain up to 2.0 wt.-% additives, like nucleating agents and antioxidants, as well as slip agents and talc.

The instant invention is also directed to the use of the heterophasic propylene copolymer (HECO) for packing material.

Furthermore, the present invention relates to packing material, like injection-moulded packaging containers like thin-walled injection mouldings, houseware articles and transport packaging, comprising, preferably comprising at least 75 wt.-%, more preferably comprising at least 90 wt.-%, like at least 95 wt.-%, most preferably consists of, a heterophasic propylene copolymer (HECO) as defined in the instant invention.

The heterophasic propylene copolymer (HECO) as defined above is preferably produced by a sequential polymerization process as defined below.

Accordingly the present invention is directed to a sequential polymerization process for producing a heterophasic propylene copolymer (HECO) according to the instant invention, said heterophasic propylene copolymer (HECO) comprises a first polypropylene fraction (PP1), a second polypropylene fraction (PP2) and a third polypropylene fraction (PP3), wherein said process comprises the steps of (a1) polymerizing propylene and optionally at least one ethylene and/or $C_4$ to $C_{12}$ α-olefin in a first reactor (R1) obtaining the first polypropylene fraction (PP1), preferably said first polypropylene fraction (PP1) is a first propylene homopolymer fraction (H-PP1), (b1) transferring the first polypropylene fraction (PP1) into a second reactor (R2), (c1) polymerizing in the second reactor (R2) and in the presence of said first polypropylene fraction (PP1) propylene and optionally at least one ethylene and/or $C_4$ to $C_{12}$ α-olefin obtaining thereby the second polypropylene fraction (PP2), preferably said second polypropylene fraction (PP2) is a second propylene homopolymer fraction (H-PP2), the first polypropylene fraction (PP1) being mixed with the second polypropylene fraction (PP2), (d1) transferring the mixture of step (c1) into a third reactor (R3), (e1) polymerizing in the third reactor (R3) and in the presence of the mixture obtained in step (c1) propylene and optionally at least one ethylene and/or $C_4$ to $C_{12}$ α-olefin obtaining thereby a third polypropylene fraction (PP3), preferably said third polypropylene fraction (PP3) is a third propylene homopolymer fraction (H-PP3), the first polypropylene fraction (PP1), the second polypropylene fraction (PP2) and the third polypropylene fraction (PP3) form the polypropylene (PP), (f1) transferring the polypropylene (PP) in a fourth reactor (R4), and (g1) polymerizing in the fourth reactor (R4) and in the presence of the polypropylene (PP) propylene and at least one ethylene and/or $C_4$ to $C_{12}$ α-olefin obtaining thereby an elastomeric propylene copolymer (EC), the polypropylene (PP) and the elastomeric propylene copolymer (EC) form the heterophasic propylene copolymer (HECO), or (a2) polymerizing propylene and optionally at least one ethylene and/or $C_4$ to $C_{12}$ α-olefin in a first reactor (R1) obtaining the first polypropylene fraction (PP1), (b2) transferring the first polypropylene fraction (PP1) into a second reactor (R2), (c2) polymerizing in the second reactor (R2) and in the presence of said first polypropylene fraction (PP1) propylene and optionally at least one ethylene and/or $C_4$ to $C_{12}$ α-olefin obtaining thereby the third polypropylene fraction (PP3), the first polypropylene fraction (PP1) being mixed with the third polypropylene fraction (PP3), (d2) transferring the mixture of step (c2) into a third reactor (R3), (e2) polymerizing in the third reactor (R3) and in the presence of the mixture obtained in step (c2) propylene and optionally at least one ethylene and/or $C_4$ to $C_{12}$ α-olefin obtaining thereby a second polypropylene fraction (PP2), the first polypropylene fraction (PP1), the second polypropylene fraction (PP2) and the third polypropylene fraction (PP3) form the polypropylene (PP), (f2) transferring the polypropylene (PP) into a fourth reactor (R4), and (g2) polymerizing in the fourth reactor (R4) and in the presence of the polypropylene (PP) propylene and at least one ethylene and/or $C_4$ to $C_{12}$ α-olefin obtaining thereby an elastomeric propylene copolymer (EC), the polypropylene (PP) and the elastomeric propylene copolymer (EC) form the heterophasic propylene copolymer (HECO).

Preferably between the second reactor (R2) and the third reactor (R3) and optionally between the third reactor (R3) and fourth reactor (R4) the monomers are flashed out.

For preferred embodiments of the heterophasic propylene copolymer (HECO), the polypropylene (PP), the first polypropylene fraction (PP1), the second polypropylene fraction (PP2), and the third polypropylene fraction (PP3), as well as for the elastomeric copolymer (EC) reference is made to the definitions given above.

The term "sequential polymerization process" indicates that the polypropylene is produced in at least four reactors connected in series. Accordingly the present process comprises at least a first reactor (R1), a second reactor (R2), a third reactor (R3) and a fourth reactor (R4). The term "polymerization reactor" shall indicate that the main polymerization takes place. Thus in case the process consists of four polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2), the third reactor (R3) and the fourth reactor (R4) are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor (R1) is a slurry reactor (SR), like loop reactor (LR), whereas the second reactor (R2), the third reactor (R3) and the fourth reactor (R4) are gas phase reactors (GPR). Accordingly for the instant process at least four, preferably four polymerization reactors, namely a slurry reactor (SR), like loop reactor (LR), a first gas phase reactor (GPR-1), a second gas phase reactor (GPR-2) and a third gas phase reactor (GPR-3) connected in series are used. If needed prior to the slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (HECO) as defined above the conditions for the first reactor (R1), i.e. the slurry reactor (SR), like a loop reactor (LR), of step (a) may be as follows:
 the temperature is within the range of 50° C. to 110° C., preferably between 60° C. and 100° C., more preferably between 68 and 95° C.,
 the pressure is within the range of 20 bar to 80 bar, preferably between 40 bar to 70 bar,
 hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:
 the temperature is within the range of 50° C. to 130° C., preferably between 60° C. and 100° C.,
 the pressure is within the range of 5 bar to 50 bar, preferably between 15 bar to 35 bar,
 hydrogen can be added for controlling the molar mass in a manner known per se.

The condition in the third reactor (R3) and the fourth reactor (R4), preferably in the second gas phase reactor (GPR-2) and third gas phase reactor (GPR-4), is similar to the second reactor (R2).

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (HECO) is obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention is prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

(I)

wherein R1' and R2' are independently at least a $C_5$ alkyl under conditions where a transesterification between said $C_1$ to $C_2$ alcohol and said dialkylphthalate of formula (I) takes place to form the internal donor c) washing the product of stage b) or
d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2$*nROH, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2$*nROH, wherein R is methyl or ethyl, preferably ethyl and n is 1 to 6, is contacting with $TiCl_4$ to form a titanized carrier, followed by the steps of
adding to said titanised carrier
(i) a dialkylphthalate of formula (I) with R1' and R2' being independently at least a $C_5$-alkyl, like at least a $C_8$-alkyl, or preferably
(ii) a dialkylphthalate of formula (I) with R1' and R2' being the same and being at least a $C_5$-alkyl, like at least a $C_8$-alkyl,
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol-%, of a dialkylphthalate of formula (II)

(II)

with $R^1$ and $R^2$ being methyl or ethyl, preferably ethyl, the dialkylphthalate of formula (II) being the internal donor and
recovering said transesterification product as the procatalyst composition (component (i)).

The adduct of the formula $MgCl_2$*nROH, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the BCF20P catalyst of Borealis (prepared according to WO 92/19653 as disclosed in WO 99/24479; especially with the use of dioctylphthalate as dialkylphthalate of formula (I) according to WO 92/19658) or the catalyst Polytrack 8502, commercially available from Grace.

For the production of the heterophasic propylene copolymer (HECO) according to the invention the catalyst system used preferably comprises in addition to the special Ziegler-Nana procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (III)

$$Si(OCH_3)_2R_2^5 \qquad (III)$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

More preferably the external donor is selected from the group consisting of diethylaminotriethoxysilane [Si(OCH$_2$CH$_3$)$_3$(N(CH$_2$CH$_3$)$_2$)], dicyclopentyl dimethoxy silane [Si(OCH$_3$)$_2$(cyclo-pentyl)$_2$], diisopropyl dimethoxy silane [Si(OCH$_3$)$_2$(CH(CH$_3$)$_2$)$_2$] and mixtures thereof.

In a further embodiment, the Ziegler-Natta procatalyst can be modified by polymerising a vinyl compound in the presence of the catalyst system, comprising the special Ziegler-Natta procatalyst (component (i)), an external donor (component (iii)) and optionally a cocatalyst (component (iii)), which vinyl compound has the formula:

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic propylene copolymer according to this invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

The additives as stated above are added afterwards to the heterophasic propylene copolymer (HECO), which is collected from the final reactor of the series of reactors. Preferably, these additives are mixed into the composition prior to or during the extrusion process in a one-step compounding process. Alternatively, a master batch may be formulated, wherein the heterophasic propylene copolymer (HECO) is first mixed with only some of the additives.

For mixing, a conventional compounding or blending apparatus, e.g. a Banbury mixer, a 2-roll rubber mill, Buss-co-kneader or a twin screw extruder may be used. The polymer materials recovered from the extruder are usually in the form of pellets. These pellets are then preferably further processed, e.g. by injection molding to generate articles, like packing material, of the inventive heterophasic propylene copolymer (HECO).

The heterophasic propylene copolymer (HECO) according to the invention may be pelletized and compounded using any of the variety of compounding and blending methods well known and commonly used in the resin compounding art.

In the following the present invention is further illustrated by means of examples.

EXAMPLES

A. Measuring Methods

The following definitions of terms and determination methods apply for the above general description of the invention as well as to the below examples unless otherwise defined.

Calculation of comonomer content of the second polypropylene fraction (PP2):

$$\frac{C(R2) - w(PP1) \times C(PP1)}{w(PP2)} = C(PP2)$$

wherein w(PP1) is the weight fraction of the first polypropylene fraction (PP1), i.e. the product of the first reactor (R1), w(PP2) is the weight fraction of the second polypropylene fraction (PP2), i.e. of the polymer produced in the second reactor (R2), C(PP1) is the comonomer content [in wt.-%] measured by Fourier transform infrared spectroscopy (FTIR) of the first polypropylene fraction (PP1), i.e. of the product of the first reactor (R1), C(R2) is the comonomer content [in wt.-%] measured by Fourier transform infrared spectroscopy (FTIR) of the product obtained in the second reactor (R2), i.e. the mixture of the first polypropylene fraction (PP1) and the second polypropylene fraction (PP2), C(PP2) is the calculated comonomer content [in wt.-%] of the second polypropylene (PP2).

Calculation of the xylene cold soluble (XCS) content of the second polypropylene fraction (PP2):

$$\frac{XS(R2) - w(PP1) \times XS(PP1)}{w(PP2)} = XS(PP2)$$

wherein
w(PP1) is the weight fraction of the first polypropylene fraction (PP1), i.e. the product of the first reactor (R1),
w(PP2) is the weight fraction of the second polypropylene fraction (PP2), i.e. of the polymer produced in the second reactor (R2),
XS(PP1) is the xylene cold soluble (XCS) content [in wt.-%] as determined at 23° C. according to ISO 6427 of the first polypropylene fraction (PP1), i.e. of the product of the first reactor (R1),
XS(R2) is the xylene cold soluble (XCS) content [in wt.-%] as determined at 23° C. according to ISO 6427 of the product obtained in the second reactor (R2), i.e. the mixture of the first polypropylene fraction (PP1) and the second polypropylene fraction (PP2),
XS(PP2) is the calculated xylene cold soluble (XCS) content [in wt.-%] of the second polypropylene fraction (PP2).

Calculation of melt flow rate $MFR_2$ (230° C.) of the second polypropylene fraction (PP2):

$$MFR(PP2) = 10^{\left[\frac{\log(MFR(R2)) - w(PP1) \times \log(MFR(PP1))}{w(PP2)}\right]}$$

wherein
w(PP1) is the weight fraction of the first polypropylene fraction (PP1), i.e. the product of the first reactor (R1),
w(PP2) is the weight fraction of the second polypropylene fraction (PP2), i.e. of the polymer produced in the second reactor (R2),
MFR(PP1) is the melt flow rate $MFR_2$ (230° C.) [in g/10 min] measured according ISO 1133 of the first polypropylene fraction (PP1), i.e. of the product of the first reactor (R1),
MFR(R2) is the melt flow rate $MFR_2$ (230° C.) [in g/10 min] measured according ISO 1133 of the product obtained in the second reactor (R2), i.e. the mixture of the first polypropylene fraction (PP1) and the second polypropylene fraction (PP2),
MFR(PP2) is the calculated melt flow rate $MFR_2$ (230° C.) [in g/10 min] of the second polypropylene fraction (PP2).

Calculation of comonomer content of the third polypropylene fraction (PP3):

$$\frac{C(R3) - w(R3) \times C(R2)}{w(PP3)} = C(PP3)$$

wherein
w(R2) is the weight fraction of the second reactor (R2), i.e. the mixture of the first polypropylene fraction (PP1) and the second polypropylene fraction (PP2),
w(PP3) is the weight fraction of the third polypropylene fraction (PP3), i.e. of the polymer produced in the third reactor (R3),
C(R2) is the comonomer content [in wt.-%] measured by Fourier transform infrared spectroscopy (FTIR) of the product of the second reactor (R2), i.e. the mixture of the first polypropylene fraction (PP1) and second polypropylene fraction (PP2),
C(R3) is the comonomer content [in wt.-%] measured by Fourier transform infrared spectroscopy (FTIR) of the product obtained in the third reactor (R3), i.e. the mixture of the first polypropylene fraction (PP1), the second polypropylene fraction (PP2), and the third polypropylene fraction (PP3),
C(PP3) is the calculated comonomer content [in wt.-%] of the third polypropylene fraction (PP3).

Calculation of xylene cold soluble (XCS) content of the third polypropylene fraction (PP3):

$$\frac{XS(R3) - w(R2) \times XS(R2)}{w(PP3)} = XS(PP3)$$

wherein
w(R2) is the weight fraction of the second reactor (R2), i.e. the mixture of the first polypropylene fraction (PP1) and the second polypropylene fraction (PP2),
w(PP3) is the weight fraction of the third polypropylene fraction (PP3), i.e. of the polymer produced in the third reactor (R3),
XS(R2) is the xylene cold soluble (XCS) content [in wt.-%] as determined at 23° C. according to ISO 6427 of the product of the second reactor (R2), i.e. of the mixture of the first polypropylene fraction (PP1) and second polypropylene fraction (PP2),
XS(R3) is the xylene cold soluble (XCS) content [in wt.-%] as determined at 23° C. according to ISO 6427 of the product obtained in the third reactor (R3), i.e. the mixture of the first polypropylene fraction (PP1), the second polypropylene fraction (PP2), and the third polypropylene fraction (PP3),
XS(PP3) is the calculated xylene cold soluble (XCS) content [in wt.-%] of the third polypropylene fraction (PP3).

Calculation of melt flow rate $MFR_2$ (230° C.) of the third polypropylene fraction (PP3):

$$MFR(PP3) = 10^{\left[\frac{\log(MFR(R3)) - w(R2) \times \log(MFR(R2))}{w(PP3)}\right]}$$

wherein
w(R2) is the weight fraction of the second reactor (R2), i.e. the mixture of the first polypropylene fraction (PP1) and the second polypropylene fraction (PP2),
w(PP3) is the weight fraction of the third polypropylene fraction (PP3), i.e. of the polymer produced in the third reactor (R3),
MFR(R2) is the melt flow rate $MFR_2$ (230° C.) [in g/10 min] measured according ISO 1133 of the product of the second reactor (R2), i.e. of the mixture of the first polypropylene fraction (PP1) and second polypropylene fraction (PP2),
MFR(R3) is the melt flow rate $MFR_2$ (230° C.) [in g/10 min] measured according ISO 1133 of the product obtained in the third reactor (R3), i.e. the mixture of the first polypropylene fraction (PP1), the second polypropylene fraction (PP2), and the third polypropylene fraction (PP3),
MFR(PP3) is the calculated melt flow rate $MFR_2$ (230° C.) [in g/10 min] of the third polypropylene fraction (PP3).

NMR-Spectroscopy Measurements:
The $^{13}$C-NMR spectra of polypropylenes were recorded on Bruker 400 MHz spectrometer at 130° C. from samples dissolved in 1,2,4-trichlorobenzene/benzene-d6 (90/10 w/w). For the pentad analysis the assignment is done according to the methods described in literature: (T. Hayashi, Y. Inoue, R.

Chüjö, and T. Asakura, Polymer 29 138-43 (1988). and Chujo R, et al, Polymer 35 339 (1994).

The NMR-measurement was used for determining the mmmm pentad concentration in a manner well known in the art.

Number average molecular weight ($M_n$), weight average molecular weight ($M_w$) and molecular weight distribution (MWD) are determined by Gel Permeation Chromatography (GPC) according to the following method:

The weight average molecular weight Mw and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 µL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

Melt Flow Rate ($MFR_2$)

The melt flow rates were measured with a load of 2.16 kg ($MFR_2$) at 230° C. The melt flow rate is that quantity of polymer in grams which the test apparatus standardized to ISO 1133 extrudes within 10 minutes at a temperature of 230° C. under a load of 2.16 kg.

Comonomer content in polyethylene was measured in a known manner based on Fourier transform infrared spectroscopy (FTIR) calibrated with $^{13}$C-NMR, using Nicolet Magna 550 IR spectrometer together with Nicolet Omnic FTIR software.

Films having a thickness of about 250 µm were compression molded from the samples. Similar films were made from calibration samples having a known content of the comonomer. The comonomer content was determined from the spectrum from the wave number range of from 1430 to 1100 cm$^{-1}$. The absorbance is measured as the height of the peak by selecting the so-called short or long base line or both. The short base line is drawn in about 1410-1320 cm$^{-1}$ through the minimum points and the long base line about between 1410 and 1220 cm$^{-1}$. Calibrations need to be done specifically for each base line type. Also, the comonomer content of the unknown sample needs to be within the range of the comonomer contents of the calibration samples.

Xylene Cold Soluble Fraction (XCS Wt-%)

The xylene cold soluble fraction (XCS) is determined at 23° C. according to ISO 6427.

The amorphous content (AM) is measured by separating the above xylene cold soluble fraction (XCS) and precipitating the amorphous part with acetone. The precipitate was filtered and dried in a vacuum oven at 90° C.

$$AM\% = \frac{100 \times m1 \times v0}{m0 \times v1}$$

wherein
"AM %" is the amorphous fraction,
"m0" is initial polymer amount (g)
"m1" is weight of precipitate (g)
"v0" is initial volume (ml)
"v1" is volume of analyzed sample (ml)

Intrinsic viscosity is measured according to DIN ISO 1628/1, October 1999 (in Decalin at 135° C.).

Melting temperature $T_m$, crystallization temperature $T_c$, is measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Also the melt- and crystallization enthalpy (Hm and Hc) were measured by the DSC method according to ISO 11357-3.

Vicat B:

Vicat B is measured according to ISO 306 (50 N) using injection moulded test specimens as described in EN ISO 1873-2 (80×10×4 mm). Vicat B is the temperature at which the specimen is penetrated to a depth of 1 mm by a flat-ended needle with a 1 sq. mm circular or square cross-section, under a 1000 gm load.

Tensile Modulus is measured according to ISO 527-2 (cross head speed=50 mm/min; 23° C.) using injection molded specimens as described in EN ISO 1873-2 (dog bone shape, 4 mm thickness).

Charpy notched impact strength is determined according to ISO 179/1 eA at 23° C. and at −20° C. by using injection moulded test specimens as described in EN ISO 1873-2 (80×10×4 mm).

The hexane extractable fraction was determined according to FDA method (federal registration, title 21, Chapter 1, part 177, section 1520, s. Annex B). 1 g sample of cast film of 100 µm thickness (produced on a monolayer cast film line with a melt temperature of 220° C. and a chill roll temperature of 40° C.) was extracted at 50° C. in 400 ml n-hexane for 2 hours and then filtered on a filter paper N° 41. The filtrate was then evaporated and the total residue weighed as a measure of the n-hexane extractable fraction.

B. Examples

All polymers were produced in a Borstar pilot plant with a prepolymerization reactor, one slurry loop reactor and three gas phase reactors. The catalyst Polytrack 8502, commercially available from Grace (US) was used in combination with diethylaminotriethoxysilane [Si(OCH$_2$CH$_3$)$_3$(N(CH$_2$CH$_3$)$_2$)] as external donor and triethylaluminium (TEAL) as activator and scavenger in the ratios indicated in table 1. The catalyst was modified by polymerising a vinyl compound in the presence of the catalyst system.

TABLE 1

Preparation of the heterophasic propylene copolymers (HECO)

| Parameter | unit | IE 1 | IE 2 | IE3 | CE 1 |
|---|---|---|---|---|---|
| Prepolymerization | | | | | |
| temperature | [° C.] | 30 | 30 | 30 | 30 |
| pressure | [kPa] | 5400 | 5200 | 5300 | 5200 |
| Al/donor ratio | [mol/mol] | 15 | 14 | 15 | 5 |
| residence time | [h] | 0.3 | 0.3 | 0.5 | 0.3 |
| Loop | | | | | |
| temperature | [° C.] | 75 | 70 | 70 | 75 |
| pressure | [kPa] | 5700 | 5500 | 5500 | 5500 |

TABLE 1-continued

Preparation of the heterophasic propylene copolymers (HECO)

| Parameter | unit | IE 1 | IE 2 | IE3 | CE 1 |
|---|---|---|---|---|---|
| residence time | [h] | 0.3 | 0.5 | 0.5 | 0.3 |
| ethylene feed | [kg/h] | 0 | 0 | 0 | 0 |
| H2/C3 ratio | [mol/kmol] | 30 | 25 | 25 | 30 |
| GPR 1 | | | | | |
| temperature | [° C.] | 80 | 80 | 80 | — |
| pressure | [kPa] | 2100 | 2000 | 1500 | — |
| residence time | [h] | 1.8 | 3 | 1.6 | — |
| ethylene feed | [kg/h] | 0 | 0.2 | 0.2 | — |
| H2/C3 ratio | [mol/kmol] | 90 | 180 | 190 | — |
| GPR 2 | | | | | |
| temperature | [° C.] | 85 | 90 | 90 | 85 |
| pressure | [kPa] | 3200 | 2900 | 2800 | 2100 |
| residence time | [h] | 2.1 | 2.3 | 1.7 | 1.8 |
| ethylene feed | [kg/h] | 0.1 | 0.1 | 0.5 | 0.1 |
| H2/C3 ratio | [mol/kmol] | 110 | 30 | 30 | 125 |
| GPR 3 | | | | | |
| temperature | [° C.] | 80 | 80 | 80 | 80 |
| pressure | [kPa] | 2200 | 2600 | 2600 | 2000 |
| residence time | [h] | 0.7 | 0.9 | 1.0 | 0.5 |
| ethylene feed | [kg/h] | 25 | 25 | 34 | 25 |
| H2/C2 ratio | [mol/kmol] | 200 | 90 | 110 | 210 |
| C2/C3 ratio | [mol/kmol] | 500 | 500 | 500 | 500 |

TABLE 2

Properties of the heterophasic propylene copolymers (HECO) Loop, GPR1, GPR2, GPR 3

| | | IE 1 | IE 2 | IE3 | CE 1 |
|---|---|---|---|---|---|
| Loop | | | | | |
| split | [wt.-%] | 39 | 36 | 33 | 44 |
| MFR$_2$ | [g/10 min] | 256 | 234 | 244 | 206 |
| XCS | [wt.-%] | 2.5 | 2.2 | 1.9 | 2.2 |
| Mw | [kg/mol] | 90 | 92 | 91 | 96 |
| GPR1 | | | | | |
| split | [wt.-%] | 32 | 31 | 29 | — |
| MFR$_2$ of PP made in GPR1 | [g/10 min] | 13 | 151 | 96 | — |
| MFR$_2$ of GPR1 | [g/10 min] | 67 | 190 | 159 | — |
| XCS of PP made in GPR1 | [wt.-%] | 1.4 | 1.1 | 1.5 | — |
| XCS of GPR1 | [wt.-%] | 2.0 | 1.7 | 1.7 | — |
| GPR2 | | | | | |
| split | [wt.-%] | 18 | 25 | 25 | 41 |
| MFR$_2$ made in GPR2 | [g/10 min] | 61 | 5 | 12 | 25 |
| MFR$_2$ of GPR2 | [g/10 min] | 66 | 74 | 83 | 74 |
| XCS of PP made in GPR2 | [wt.-%] | 1.5 | 1.7 | 2.6 | 1 |
| XCS of GPR2 | [wt.-%] | 1.9 | 1.7 | 2 | 1.6 |
| Mn of Matrix | | 29 | 26 | 27 | 30 |
| Mw of Matrix | | 140 | 145 | 136 | 130 |
| MWD of Matrix | | 4.9 | 5.6 | 5.1 | 4.3 |
| GPR3 | | | | | |
| Split | [wt.-%] | 11 | 8 | 13 | 15 |
| MFR2 of GPR3 | [g/10 min] | 46 | 43 | 47 | 46 |
| IV(AM) | [dl/g] | 2.5 | 3.1 | 2.9 | 2.5 |
| C2(AM) | [wt.-%] | 40 | 36 | 39 | 36 |
| C2 of GPR | [wt.-%] | 5 | 5 | 6.5 | 6 |
| XCS made in GPR3 | [wt.-%] | 11.4 | 11.3 | 11.3 | 13.4 |
| XCS of GPR3 | [wt.-%] | 13.3 | 13 | 13.9 | 15 |

TABLE 3

Properties of the heterophasic propylene copolymers (HECO)

| | | IE 1 | IE 2 | IE3 | CE 1 |
|---|---|---|---|---|---|
| Tensile modulus | [MPa] | 1750 | 1750 | 1700 | 1600 |
| Vicat B | [° C.] | 82 | 83 | 80 | 78 |
| NIS (23° C.) | [kJ/m$^2$] | 4.5 | 5.0 | 4.0 | 3.5 |
| NIS (−20° C.) | [kJ/m$^2$] | 3.0 | 3.0 | 2 | 2.0 |
| Tm | [° C.] | 166 | 167 | 165 | 166 |
| Tc | [° C.] | 127 | 126 | 129 | 129 |
| Hexane solubles | [wt.-%] | 3.1 | 2.9 | 2.3 | 3.6 |

The invention claimed is:

1. Heterophasic propylene copolymer (HECO) comprising:
   (a) a matrix (M) being a polypropylene (PP), said polypropylene (PP) comprises at least three polypropylene fractions (PP1), (PP2) and (PP3), the three polypropylene fractions (PP1), (PP2) and (PP3) differ from each other by the melt flow rate MFR$_2$ (230° C.) measured according to ISO 1133 and at least one of the three polypropylene fractions (PP1), (PP2) and (PP3) has a melt flow rate MFR$_2$ (230° C.) measured according to ISO 1133 in the range of 1.0 to 15.0 g/10 min, and
   (b) an elastomeric propylene copolymer (EC) dispersed in said matrix (M), wherein;
      (i) said heterophasic propylene copolymer (HECO) has a melt flow rate MFR$_2$ (230° C.) measured according to ISO 1133 of equal or more than 20.0 g/10 min, and
      (ii) the amorphous phase (AM) of the xylene cold soluble fraction (XCS) of the heterophasic propylene copolymer (HECO) has an intrinsic viscosity (IV) measured according to ISO 1628-1 (at 135° C. in decaline) of equal or higher than 2.0 dl/g.

2. Heterophasic propylene copolymer (HECO) according to claim 1, wherein the polypropylene (PP) has:
   (a) a melt flow rate MFR$_2$ (230° C.) measured according to ISO 1133 in the range of 30.0 to 500.0 g/10 min, and/or
   (b) a molecular weight distribution (MWD) of equal or less than 8.0.

3. Heterophasic propylene copolymer (HECO) according to claim 1, wherein the polypropylene (PP) has:
   (a) a comonomer content equal or below 1.0 wt. %, and/or
   (b) a xylene cold soluble (XCS) fraction measured according to ISO 6427 (23° C.) of equal or below 3.5 wt. %.

4. Heterophasic propylene copolymer (HECO) according to claim 1, wherein the polypropylene fraction with the melt flow rate MFR$_2$ (230° C.) measured according to ISO 1133 in the range of 1.0 to 15.0 g/10 min is the polypropylene fraction with the lowest melt flow rate MFR$_2$ (230° C.) of the three polypropylene fractions (PP1), (PP2) and (PP3).

5. Heterophasic propylene copolymer (HECO) according to claim 1, wherein:
   (a1) one of the three polypropylene fractions (PP1), (PP2) and (PP3) has a melt flow rate MFR$_2$ (230° C.) measured according to ISO 1133 in the range of 1.0 to 15.0 g/10 min, and
   (b1) another of the three polypropylene fractions (PP1), (PP2) and (PP3) has a melt flow rate MFR$_2$ (230° C.) measured according to ISO 1133 in the range of 150.0 to 500.0 g/10 min.

6. Heterophasic propylene copolymer (HECO) according to claim 1, wherein the second polypropylene fraction (PP2) has a melt flow rate MFR$_2$ (230° C.) measured according to ISO 1133 in the range of 20.0 to 300.0 g/10 min.

7. Heterophasic propylene copolymer (HECO) according to claim 1, wherein all three polypropylene fractions (PP1), (PP2) and (PP3) are propylene homopolymers.

8. Heterophasic propylene copolymer (HECO) according to claim 1, wherein each of the three polypropylene fractions (PP1), (PP2) and (PP3) has a xylene cold soluble (XCS) content of equal or below 4.0 wt. %.

9. Heterophasic propylene copolymer (HECO) according to claim 1, wherein:
   (a) the amount of the third polypropylene fraction (PP3) is in the range of 15.0 to 60.0 wt. % based on the total amount of the polypropylene (PP), and/or
   (b) the amount of the first polypropylene fraction (PP1) is in the range of 20.0 to 65.0 wt. % based on the total amount of the polypropylene (PP).

10. Heterophasic propylene copolymer (HECO) according to claim 1, wherein weight ratio [PP3/PP1] of the third polypropylene fraction (PP3) and the first polypropylene fraction is in the range of 15/85 to 75/25.

11. Heterophasic propylene copolymer (HECO) according to claim 1, wherein
   (a) the comonomers of the elastomeric copolymer (EC) are ethylene and/or at least one $C_4$ to $C_{10}$ α-olefin, and/or
   (b) the amorphous phase (AM) of the xylene cold soluble fraction (XCS) of the heterophasic propylene copolymer (HECO) has a comonomer content of below 45.0 wt. %.

12. Heterophasic propylene copolymer (HECO) according to claim 1, wherein the heterophasic propylene copolymer (HECO) has:
   (a) a comonomer content equal or below 10.0 wt. %, and/or
   (b) a xylene cold soluble (XCS) fraction measured according to ISO6427 (23° C.) of equal or below 20.0 wt. %, and/or
   (c) hexane solubles measured according to FDA of below 3.6 wt. %, and/or
   (d) a heat resistance measured according to Vicat B of more than 78° C.

13. Heterophasic propylene copolymer (HECO) according to claim 1, wherein the heterophasic propylene copolymer (HECO) comprises:
   (a) 80.0 to 94.0 wt. % of the polypropylene (PP), and
   (b) 6.0 to 20.0 wt. % of the elastomeric copolymer (EC), based on the total amount of the polypropylene (PP) and the elastomeric copolymer (EC), wherein the amount of the elastomeric copolymer (EC) corresponds to the amount of the amorphous fraction (AM) of the xylene cold soluble (XCS) fraction.

14. Heterophasic propylene copolymer (HECO) according to claim 1, wherein the polypropylene (PP) comprises:
   (a) 20.0 to 65.0 wt. % of the first polypropylene fraction (PP1),
   (b) 20.0 to 50.0 wt. % of the second polypropylene fraction (PP2), and
   (c) 15.0 to 60.0 wt. % of the third polypropylene fraction (PP3), based on the total amount of the first polypropylene (PP1), the second polypropylene (PP2), and the third polypropylene (PP3).

15. Process for the preparation of a heterophasic propylene copolymer (HECO) according to claim 1, in a sequential polymerization process, said heterophasic propylene copolymer (HECO) comprises a first polypropylene fraction (PP1), a second polypropylene fraction (PP2) and a third polypropylene fraction (PP3), wherein said process comprises the steps of:

(a1) polymerizing propylene and optionally at least one ethylene and/or $C_4$ to $C_{12}$ α-olefin in a first reactor (R1) obtaining the first polypropylene fraction (PP1),
(b1) transferring the first polypropylene fraction (PP1) into a second reactor (R2),
(c1) polymerizing in the second reactor (R2) and in the presence of said first polypropylene fraction (PP1) propylene and optionally at least one ethylene and/or C4 to $C_{12}$ α-olefin obtaining thereby the second polypropylene fraction (PP2), the first polypropylene fraction (PP1) being mixed with the second polypropylene fraction (PP2),
(d1) transferring the mixture of step (c1) into a third reactor (R3),
(e1) polymerizing in the third reactor (R3) and in the presence of the mixture obtained in step (c1) propylene and optionally at least one ethylene and/or $C_4$ to $C_{12}$ α-olefin obtaining thereby a third polypropylene (PP3), the first polypropylene fraction (PP1), the second polypropylene fraction (PP2) and the third polypropylene fraction (PP3) form the polypropylene (PP),
(f1) transferring the polypropylene (PP) into a fourth reactor (R4), and
(g1) polymerizing in the fourth reactor (R4) and in the presence of the polypropylene (PP) propylene and at least one ethylene and/or a $C_4$ to $C_{12}$ α-olefin obtaining thereby an elastomeric propylene copolymer (EC), the polypropylene (PP) and the elastomeric propylene copolymer (EC) form the heterophasic propylene copolymer (HECO), or (a2) polymerizing propylene and optionally at least one ethylene and/or a $C_4$ to $C_{12}$ α-olefin in a first reactor (R1) obtaining the first polypropylene fraction (PP1),
(b2) transferring the first polypropylene fraction (PP1) into a second reactor (R2),
(c2) polymerizing in the second reactor (R2) and in the presence of said first polypropylene fraction (PP1) propylene and optionally at least one ethylene and/or a $C_4$ to $C_{12}$ α-olefin obtaining thereby the third polypropylene fraction (PP3), the first polypropylene fraction (PP1) being mixed with the third polypropylene fraction (PP3),
(d2) transferring the mixture of step (c2) into a third reactor (R3),
(e2) polymerizing in the third reactor (R3) and in the presence of the mixture obtained in step (c2) propylene and optionally at least one ethylene and/or a $C_4$ to $C_{12}$ α-olefin obtaining thereby a second polypropylene fraction (PP2), the first polypropylene fraction (PP1), the second polypropylene fraction (PP2) and the third polypropylene fraction (PP3) form the polypropylene (PP),
(f2) transferring the polypropylene (PP) into a fourth reactor (R4), and
(g2) polymerizing in the fourth reactor (R4) and in the presence of the polypropylene (PP) propylene and at least one ethylene and/or a $C_4$ to $C_{12}$ α-olefin obtaining thereby an elastomeric propylene copolymer (EC), the polypropylene (PP) and the elastomeric propylene copolymer (EC) form the heterophasic propylene copolymer (HECO).

16. Packaging material comprising the heterophasic propylene copolymer (HECO) according to claim 1.

* * * * *